(12) United States Patent
Sachedina et al.

(10) Patent No.: US 8,140,721 B2
(45) Date of Patent: Mar. 20, 2012

(54) SYSTEM AND METHOD FOR STARTING A BUFFER POOL

(75) Inventors: Aamer Sachedina, Newmarket (CA); Matthew A. Huras, Ajax (CA); Keriley K. Romanufa, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1867 days.

(21) Appl. No.: 10/921,469

(22) Filed: Aug. 19, 2004

(65) Prior Publication Data

US 2005/0050443 A1   Mar. 3, 2005

(30) Foreign Application Priority Data

Aug. 26, 2003 (CA) .................................. 2438366

(51) Int. Cl.
*G06F 3/00* (2006.01)
*G06F 5/00* (2006.01)
(52) U.S. Cl. ........... 710/56; 715/251; 711/119; 711/161
(58) Field of Classification Search .................. 715/525, 715/251; 711/113, 119, 161, 162; 710/56
See application file for complete search history.

(56) References Cited

U.S. PATENT DOCUMENTS

| | | | | |
|---|---|---|---|---|
| 5,297,265 A * | 3/1994 | Frank et al. | ..................... | 711/202 |
| 5,455,944 A | 10/1995 | Haderle et al. | ................ | 395/600 |
| 5,933,838 A * | 8/1999 | Lomet | .......................... | 707/202 |
| 6,073,129 A * | 6/2000 | Levine et al. | ..................... | 707/4 |
| 6,173,292 B1 | 1/2001 | Barber et al. | ................. | 707/200 |
| 6,205,450 B1 * | 3/2001 | Kanome | ....................... | 707/203 |
| 6,233,619 B1 | 5/2001 | Narisi et al. | .................... | 709/230 |
| 6,282,589 B1 | 8/2001 | Porterfield et al. | ............. | 710/52 |
| 6,301,630 B1 | 10/2001 | Chen et al. | ..................... | 710/129 |
| 6,317,134 B1 | 11/2001 | Hagemark et al. | ............ | 345/512 |
| 6,345,296 B1 | 2/2002 | McCrory et al. | ............... | 709/227 |
| 6,470,423 B1 * | 10/2002 | Ho et al. | ........................ | 711/129 |
| 6,694,412 B2 * | 2/2004 | Frank et al. | ..................... | 711/153 |
| 7,047,380 B2 * | 5/2006 | Tormasov et al. | ............ | 711/162 |
| 7,155,727 B2 * | 12/2006 | Elving | .......................... | 719/312 |

(Continued)

OTHER PUBLICATIONS

Effelsberg et al.; "Principles of Database Management"; 1984; ACM; pp. 560-595.*
Yang et al.,"Optimizing Primary Data Caches for Parallel Scientific Applications: the Pool Buffer Approach";1996, ACM, pp. 141-148.*
Smith, Alan Jay; "Cache Memories", ACM, 1982, pp. 473-530.*
Eich, Margaret, H.,"Main Memory Database Recovery", 1986, IEEE, pp. 1226-1232.*

(Continued)

*Primary Examiner* — Doug Hutton, Jr.
*Assistant Examiner* — James Debrow
(74) *Attorney, Agent, or Firm* — Law Office of Jim Boice

(57) ABSTRACT

For an information retrieval system coupled to a buffer pool maintaining a plurality of pages of recently accessed information for subsequent re-access, a technique for starting the buffer pool is provided. The technique facilitates a quicker start to the buffer pool by deferring allocation of page storing portions, for example, until they are needed. The technique makes the buffer pool available for storing pages while deferring allocation of a page storing portion of the buffer pool and allocates the page storing portion of the buffer pool in response to a demand to store pages to the buffer pool. The technique may be used to re-start a buffer pool with pages stored to a memory coupled to the information retrieval system where the pages where stored upon a buffer pool shutdown. Further, buffer pool readers or prefetchers may be configured to read pages for storing to the buffer pool and allocate the page storing portions of the buffer pool in response to instructions to read particular pages.

17 Claims, 3 Drawing Sheets

U.S. PATENT DOCUMENTS

| | | | |
|---|---|---|---|
| 2002/0138695 A1* | 9/2002 | Beardsley et al. | 711/113 |
| 2002/0188691 A1 | 12/2002 | Ignatius et al. | 709/208 |
| 2003/0051113 A1* | 3/2003 | Beardsley et al. | 711/163 |
| 2003/0097394 A1* | 5/2003 | Chauvel et al. | 709/100 |
| 2003/0115420 A1* | 6/2003 | Tsirigotis et al. | 711/133 |

OTHER PUBLICATIONS

"Operating the Software AG Editor", Software AG, pp. 1-7, 1999.

Kempter, K. "Informix Unleashed", Configuring the Informix Environment, Macmillan Computer Publishing, Chapter 11, 1996.

* cited by examiner

SYSTEM AND METHOD FOR STARTING A BUFFER POOL

BACKGROUND OF THE INVENTION

1. Field of the Invention

This system and method are related to the field of database management systems and more particularly to starting a buffer pool.

2. Description of the Related Art

Many software systems such as information retrieval systems, database engines and database management systems (DBMSs) use a buffer pool or buffer cache to store recently accessed data. In these systems, buffer pool sizes are relatively large. Capacities in the 100 GB range are common. A buffer pool in such software systems consists of a number of individual fixed sized pages, so that the DBMS manages data in the database and the buffer pool by these pages.

As the database is referenced during processing of user requests, pages of the database are read from one or more disks storing the database and are cached to the buffer pool once the data in a page becomes accessed. The buffer pool may contain "clean" pages which have not been modified to memory after having been read from disk and may contain "dirty" pages which include modifications to the database in the buffer pool. When the buffer pool is shutdown, dirty pages (that is, data contained in the dirty pages) must be written to disk or other persistent storage in order to maintain the data modifications contained in those pages. Typically, existing software is faced with two problems associated with shutdown and startup of buffer pools. The first problem arises because a buffer pool is managed at the granularity of a page: the pool consists of pages in memory that are most likely not from contiguous disk locations. As a result, when a large percentage of pages are dirty, saving such pages is inefficient because saving dirty pages to disk may require writing to random or non-sequential offsets, making more frequent disk subsystem I/O effort, and the pages in the buffer pool may become saved in a non-contiguous fashion to the persistent disk storage.

The second problem results from a loss of information when the buffer pool is shutdown. A populated buffer pool contains implicit information by virtue of the pages that are cached to the buffer pool at any point in time. The set of pages that are cached in the buffer pool at some point in time represents the set of pages that the DBMS considers most likely to be reused and thus most worthy of caching at that point in time. When a buffer pool is shutdown, this cached information may be lost which is highly undesirable.

When restarted, a buffer pool management sub-system takes time to relearn which pages are the most worthy of caching to the buffer pool. This relearning effort may take a significant amount of time. As a result, the first accesses to the database will be penalized as it is necessary to read the referenced pages from disk rather than from the buffer pool. Thus, the application that needs the data will have to wait longer in comparison to the situation in which the buffer pool had already cached the desired page from persistent storage.

A third problem common to buffer pool starts and restarts is buffer pool allocation. Typically, a buffer pool is not made available for storing pages to or retrieving pages from the buffer pool until the portion of the buffer pool configured for storing pages is completely allocated in memory. This allocation may unnecessarily delay the start (or restart) of the information retrieval system using the buffer pool.

A solution to some or all of these shortcomings is therefore desired.

SUMMARY OF THE INVENTION

The present invention is directed to a system and method for warm starting a buffer pool.

In accordance with an aspect of the invention, for an information retrieval system coupled to a buffer pool maintaining a plurality of pages of recently accessed information for subsequent re-access, there is provided a method of starting the buffer pool. The method comprises making the buffer pool available for storing said pages while deferring allocation of a page storing portion of the buffer pool; and allocating the page storing portion of the buffer pool in response to a demand to store pages to said buffer pool.

According to a feature of the present aspect of the invention, wherein the information retrieval system is coupled to a memory, the method comprises re-starting the buffer pool with one or more pages of information and control information associated with said buffer pool previously stored to a memory upon a shutdown of the buffer pool.

According to a further feature, the method comprises instructing one or more readers to read pages for storing to the buffer pool, said readers allocating said page storing portion of the buffer pool in response to the one or more pages to be read.

In accordance with further aspects of the invention there are provided a system and a computer program product for starting a buffer pool.

BRIEF DESCRIPTION OF THE DRAWINGS

Further features and advantages of aspects of the present invention will become apparent from the following detailed description, taken in combination with the appended drawings, in which.

It will be noted that throughout the appended drawings, like features are identified by like reference numerals.

DESCRIPTION OF THE PREFERED EMBODIMENT

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, data processing system, or computer programming language, and thus would not be a limitation of the present invention.

Figure 1:
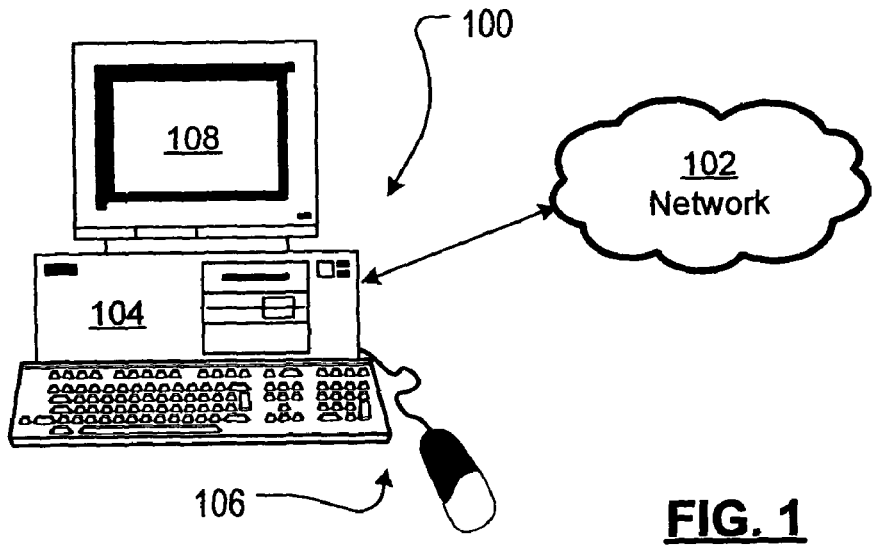
FIG. 1 schematically illustrates a computer system embodying aspects of the invention.

An embodiment of the invention, computer system 100, is illustrated in FIG. 1. Computer system 100, which is illustrated for exemplary purposes as a computing device, is adapted to communicate with other computing devices (not shown) using network 102. As will be appreciated by those of ordinary skill in the art, network 102 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 using one or more networks such as, for example, network 102. However, for ease of understanding, aspects of the invention have been embodied in a single computing device—computer system 100.

Computing device 100 typically includes a processing system 104 which is enabled to communicate with the network 102, and various input devices 106 and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 104. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
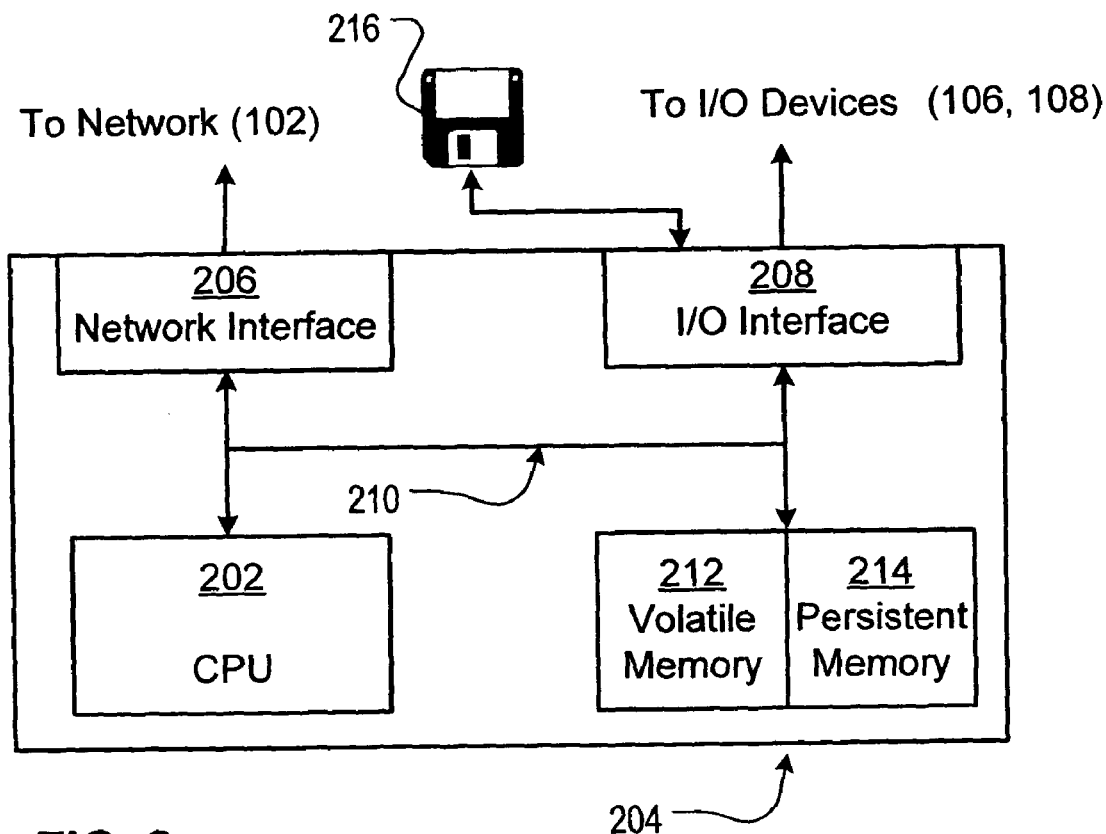
FIG. 2 schematically illustrates, in greater detail, a portion of the computer system of FIG. 1.

Exemplary processing system 104 is illustrated in greater details in FIG. 2. As illustrated, processing system 104 includes: a central processing unit (CPU) 202, memory 204, network interface (I/F) 206 and input-output interface (I/O I/F) 208. Communication between various components of the processing system 104 may be facilitated via a suitable communications bus 210 as required.

CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 104 could use alternative CPUs and may include embodiments in which two or more CPUs are employed (not shown). CPU 202 may include various support circuits to enable communication between itself and the other components of processing system 104.

Memory 204 includes both volatile memory 212 and persistent memory 214 for the storage of: operational instructions for execution by CPU 202, data registers, application and thread storage, and the like. Memory 204 preferably includes a combination of random access memory (RAM), read only memory (ROM) and persistent memory such as that provided by a hard disk drive, flash memory or the like.

Network I/F 206 enables communication between other computing devices (not shown) and other network computing devices via network 102. Network I/F 206 may be embodied in one or more conventional communication devices. Examples of a conventional communication device include: an Ethernet card, a token ring card, a modem, or the like. Network I/F 206 may also enable the retrieval or transmission of instructions for execution by CPU 202, from or to a remote storage media or device via network 102.

I/O I/F 208 enables communication between processing system 104 and the various I/O devices 106 and 108. I/O I/F 208 may include, for example, a video card for interfacing with an external display such as output device 108. Additionally, I/O I/F 208 may enable communication between processing system 104 and a removable media 216. Removable media 216 may comprise a conventional diskette or other removable memory devices such as Zip™ drives, flash cards, CD-ROMs, static memory devices and, the like. Removable media 216 may be used to provide instructions for execution by CPU 202 or as a removable data storage device. (Zip is a trademark of Iomega Corporation.)

Figure 3:
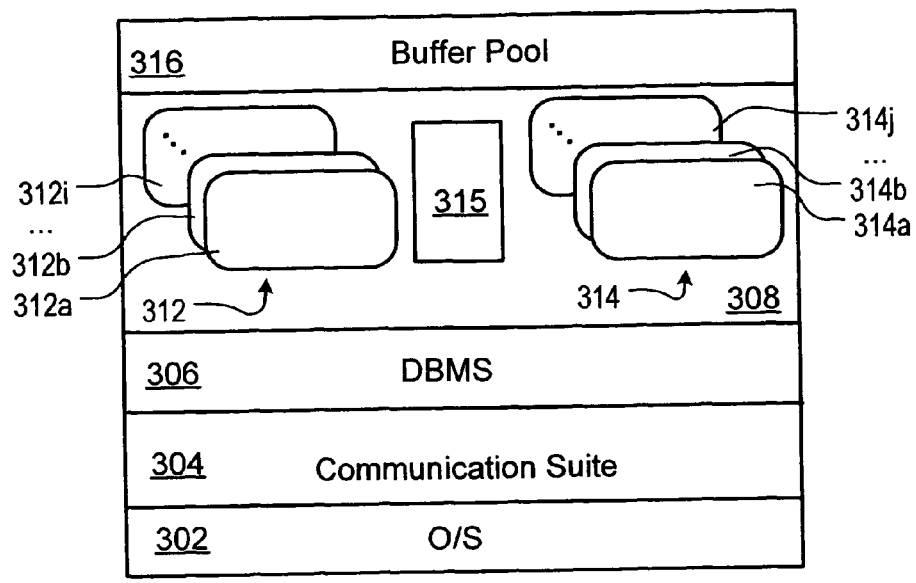
FIG. 3 illustrates, in functional block form, a portion of the memory illustrated in FIG. 2.

Computer instructions/applications stored in memory 204 and executed by CPU 202 (thus adapting the operation of the computer system 100 as described herein) are illustrated in functional block form in FIG. 3. As will be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application.

As illustrated for exemplary purposes only, memory 204 stores instructions and data for enabling the operation of the system for buffer pool warm shutdown and restart that include: an operating system (OS) 302, a communication suite 304, a database management system (DBMS) 306 adapted to include a warm shutdown and restart function 308 and a buffer pool 316. Warm shutdown and restart function 308 comprises in the exemplary embodiment, one or more writer threads 312 (multiple writer threads 312a, 312b, 312i are shown), one or more reader threads 314 (multiple reader threads 314a, 314b, 314j are shown) and a restore control 315. It will be apparent to persons skilled in the art that the buffer pool is typically stored in volatile memory 212 when in operation while the remaining instructions and data may also be stored to persistent memory during operation.

The applications such as OS 302, communications suite 304, DBMS 306, the shutdown and restart application 308, writer threads 312 and reader threads 314 may be stored to the volatile memory 214 and/or persistent memory 214. The buffer pool 316 is stored in the volatile memory 212.

OS 302 is an operating system suitable for operation with a selected CPU 202 and the operations described herein. Multi-tasking, multi-threaded OSes such as, for example, IBM AIX™, Microsoft Windows™, Linux™ or the like, are expected to be preferred in many embodiments. (Linux is a trademark of Linus Torvalds.) Buffer 316 is specifically reserved as a region of the memory 204 for storing information. Though shown as a single contiguous region, persons skilled in the art will understand that buffer pool 316 may comprise two or more regions of memory 212. Typically, each region is a multiple of the page size used by DBMS 306. Communication suite 304 provides, through interaction with OS 302 and network I/F 206 (FIG. 2), suitable communication protocols to enable communication with other networked computing devices via network 102 (FIG. 1). Communication suite 304 may include one or more of such protocols such as TCP/IP, Ethernet, token ring and the like. Communications suite 304 preferably includes asynchronous transport communication capabilities for communicating with other computing devices.

DBMS 306 is a software application executable in the environment of OS 302 in order to provide information stored in a database (none shown) to client applications (not shown) on request. The database is typically stored in persistent memory 214 or other persistent storage coupled to computer system 100. Client applications also can be run in the environment of OS 302 or can be run on other computer systems adapted to communicate with computer system 100 using the network 102.

DBMS 306, in order to minimize disk access and/or network traffic flow, stores recently accessed data from the database to the buffer pool 316 in volatile memory 212. The buffer pool 316 is often set up as part of DBMS 306 work space.

DBMS 306 may require being shutdown and restarted. In accordance with in the prior art, DBMSs save only dirty pages stored in the buffer pool 316 to the persistent storage storing the database requiring a plurality of shutdown or non-sequential writes. In accordance with the invention, DBMS 306 as adapted for warm shutdown, saves pages (for example, but not limited to, dirty pages) of the buffer pool 316 and control information associated with the pages to sequential space on persistent memory 214 using writer threads 312. Persistent memory 214 for such purposes typically comprises a hard disk drive but may include flash memory or another persistent storage device that provides sufficient I/O characteristics for fast shutdowns and restores. For example, tape media or writable CD-ROMs, DVDs or the like generally have slow write response times. Persistent storage devices with I/O characteristics similar to hard disk drives are preferred. Buffer pool information may be written in a parallel way whereby writer threads 312 can write different portions of the buffer pool at the same time to contiguous space (for example using an OS primitive such as vectored write). For I/O efficiency, large block writes such as several megabytes per write as opposed to a single page (few thousand bytes) per write may be preferred. In such a case of large block writes, both clean and dirty pages are typically written out. In order to restore data in the buffer pool 316, DBMS 306 employs reader threads 314 for restoring saved data from persistent memory 214 to buffer pool 316 as described further herein. While restoring saved data from persistent memory 214, the restore control 315 permits reference to the saved data.

Figure 4:
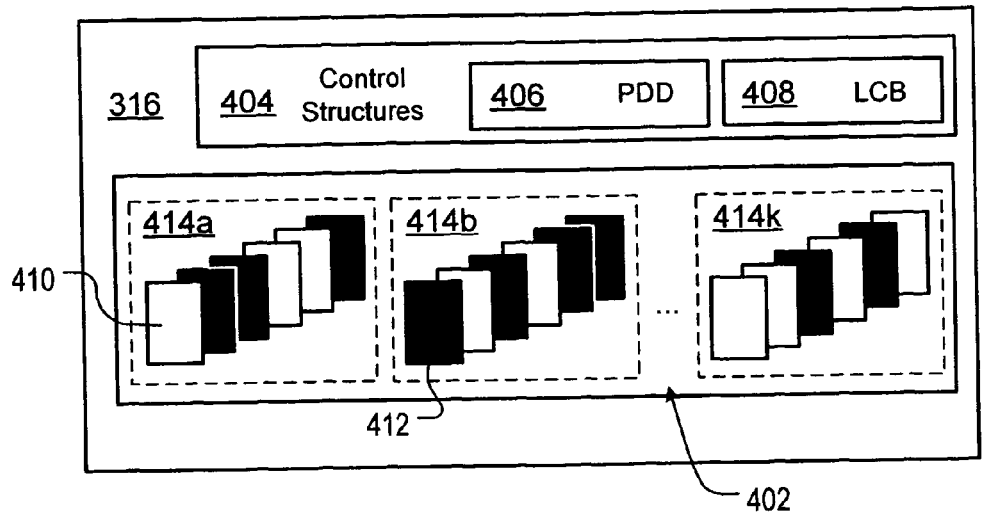
FIG. 4 schematically illustrates a buffer pool as illustrated in FIG. 3.

FIG. 4 illustrates schematically an exemplary structure of the buffer pool 316. The buffer pool 316 is used to store recently accessed data, which is stored as a plurality of memory pages 402, and control structures 404. The control structures 404 store information for describing a state of each individual page 402. Typically control structures comprise but are not limited to, page descriptor directory (PDD) 406 and log control block (LCB) 408.

Each individual page of the pages 402 may be clean (schematically illustrated as a white rectangle 410) or dirty comprising data in the buffer pool 316 that has not been stored to the persistent data store for the database (schematically illustrated as a black rectangle 412). Buffer pool 316 comprises one or more contiguous regions of volatile memory 212 where the clean and dirty pages are not separated from each other. In order to differentiate clean and dirty pages, information is maintained in an assigned page descriptor (PD) stored in PDD 406. The PD also comprises a page latch construct that is used to protect access to the page and a log sequence number (LSN) for maintaining information indicating whether the page is modified. In LCB 408, DBMS 306 maintains information such as the minimum LSN representing the oldest modification to one of the buffer pool pages in order to control how far back the DBMS 306 must maintain log records in the primary (as opposed to the archived) log space needed for crash recovery purposes.

That portion 402 of the buffer pool 316 where pages are maintained may be logically divided into a number of blocks (three blocks 414A, 414B and 414k are shown for illustrative purposes only). The size of each block may be selected to optimize input/output (I/O) efficiency (i.e. disk read and disk write access efficiency) during buffer pool shutdown and restart operations. Thus a block may be a single page or a group of contiguous pages. DBMS 306 uses writer threads 312A, 312B and 312i and may also make the process of saving information from the buffer pool 316 more effective using parallel writing of blocks 414A, 414B and 414k. Upon initiation of warm shutdown, each writer thread 312A, 312B and 312i saves a respective assigned block 414A, 414B and 414k at the same time. The same multi-thread principles may also be applied to restoring operations when the saved information is read in and restored to buffer pool 316 by a number of reader threads 314 that may read and restore information to the buffer pool simultaneously. Though described in terms of writing out blocks 414, it is understood that each writer thread 312 may be directed to write only dirty pages rather than writing the entire buffer pool.

The warm shutdown and restart of the buffer is performed in two stages. The warm shutdown stage is described in greater detail below with reference to FIG. 5, and the restart stage is described in greater detail below with reference to FIG. 6.

Figures 5, 6:
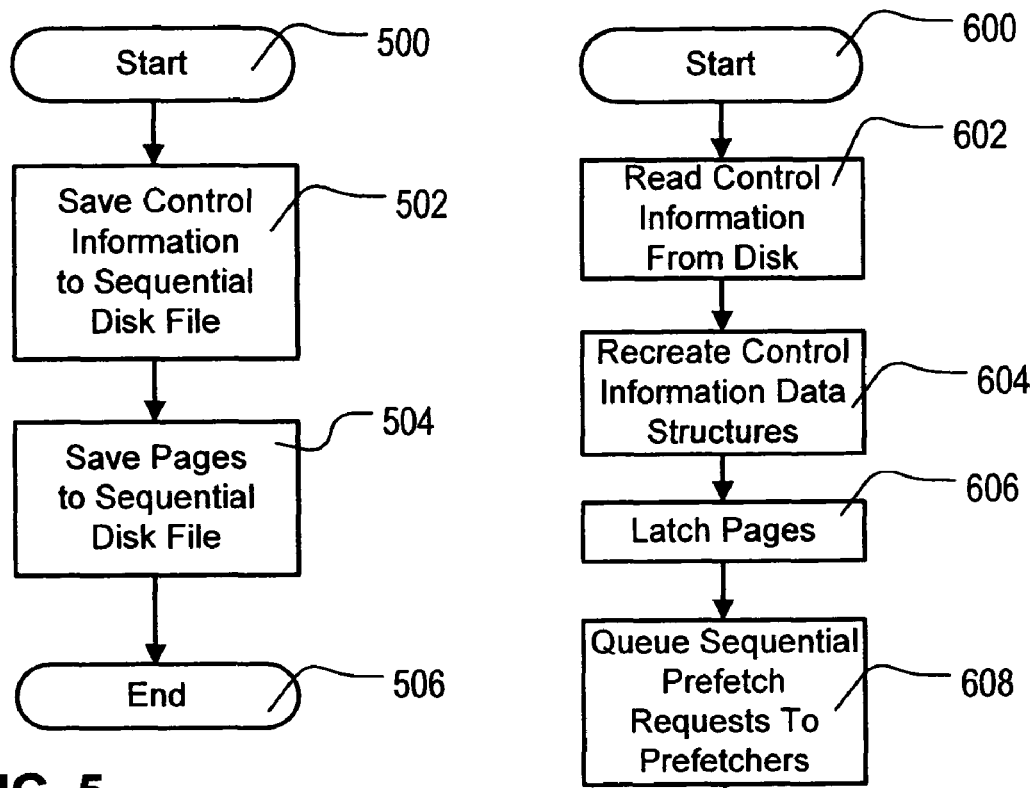
FIG. 5 is a flowchart illustrating basic operational steps involved in warm shutdown of the buffer pool illustrated in FIG. 3.
FIG. 6 is a flowchart illustrating basic operational steps involved in restarting of the buffer pool.

FIG. 5 is a flowchart illustrating the main operational steps involved in warm shutdown of the buffer pool 316 in an exemplary embodiment. On receipt of a warm shutdown request from DBMS 306 (Step 500), warm shutdown and restart function 308 saves information stored in the buffer pool 316 as a sequential disk file. The sequential disk file is saved to a user declared temporary disk or shutdown space. It is common that such temporary space already exists in DBMS 306 for temporary objects such as temporary tables and thus no additional disk space is necessary. The size of temporary disk space has to be sufficient to accommodate pages 402 stored in the buffer pool 316 and control structures 404. At step 502, the control structures 404 are saved. Pages 402 stored in the buffer pool 316 are saved to the sequential disk file on disk (Step 504). Warm shutdown and restart function 308, in order to minimize the duration of the warm shutdown, may use a number of writer threads 312 that are adapted to perform write operations simultaneously. Each writer thread 312 writes a respectively assigned block (414A, 414B, 414k) of buffer pool memory to the contiguous disk file simultaneously. On completion of writing information from the buffer pool 316 (Step 506), the DBMS 306 or the entire computer system 100 may also be shutdown in accordance with operations that will be understood to persons skilled in the art.

FIG. 6 is a flowchart illustrating the basic operational steps involved in a restart of the buffer pool 316 in accordance with an embodiment. After restarting DBMS 306, warm shutdown and restart function 308 may be invoked to restart buffer pool 316 in the memory 212. DBMS 306 determines whether to restart the buffer pool 316 as an empty buffer or use the warm shutdown and restart function 308 to restore information that was saved during the warm shutdown stage. On receipt of a restart signal from DBMS 306 (Step 600), the warm shutdown and restart function 308 reads control structure information from the contiguous disk file stored on disk (not shown) (Step 602) and recreates control structure 404 in the buffer pool 316 (Step 604). In order to recreate control structures, page descriptors are recreated in PDD 406. Then, using the information contained in the page descriptors, other control structures such as hash tables for quick lookup, linked lists to chain dirty pages, etc. which are required to support DBMS 306 operations, are also recreated.

After re-creation of the control structures 404, the latch constructs of the descriptors stored in PPD 406 are invoked to latch (e.g. Xlatch) buffer pages 402 (Step 606) in order to protect read access to those pages. This enables immediate reference to the pages before the content of these pages is restored to the buffer pool 316. After latching the pages, the buffer pool 316 is operable. As is described above, the page portion 402 of the buffer pool 316 has been logically divided into blocks and each of these blocks was saved to the contiguous disk file (step 504, FIG. 5). In order to restore pages to the buffer pool 316, each respective block (414A, 414B and 414k) is restored by reader threads 314. Block read requests are put in queues for service by reader threads 314 which operate asynchronously with respect to each other. These block read requests provide sequential prefetch to reader threads 314 (Step 610). On receipt of a block read request from the queue (Step 610), one of the reader threads 314 services the request by reading the block of pages from the sequential disk files and restoring same into the buffer pool. Information from the temporary disk store is read on a block by block basis (Step 614). The I/O is sequential and is performed in block sizes to optimize restoring operations. As each block is restored to the buffer pool 316, the pages for that block are unlatched (Step 616). One of the large costs—in terms of time—to start a buffer pool is the allocation of the buffer pool memory (volatile). In an alternative embodiment, the buffer pool 316 may be made available following the allocation and readying of the PDs, which represent a small fraction of the buffer pool size, without allocating the portion of the buffer pool 402 where pages are stored. Further allocation of the volatile memory necessary for the blocks to be restored may be performed by the reader threads before each reads an assigned block from the shutdown space. The actual buffer pool page that a PD represents need not be present when the buffer pool is opened up since the latch on the PD is held and a reader thread will only release it after first allocating the memory and then reading in the block facilitating a speedier database start up. The deferral of the allocation of the page storing portion of the buffer pool may be performed when undertaking a cold start of the buffer pool as well. Persons of ordinary skill in the art will appreciate that reader threads or other prefetchers receiving instructions to fetch pages from a database store or the shutdown space may allocate pages of the buffer pool in response to the demand to read pages for storing to the pool.

Since the buffer pool 316 is open for use before the pages are actually restored, it is possible that a client may request a page which has yet to be read and restored. The restore control 315 permits reference to pages 402 of the buffer pool 316 while restoring said pages 402. In this case, the client will have to wait on the page latch (since all pages are latched in advance (step 606)). When the page has been restored into the buffer pool 316 by the reader threads 314, the page is unlatched and the client will be granted access to use the page.

In another embodiment of the invention, warm shutdown and restart function 308 employing the restore control 315 may prioritize the restoring of a particular page in response to a client reference to the particular page. More particularly, the process of restoring pages may be organized in such a way that when a page which is not yet restored to the buffer pool 316 is first requested, the reading of the page may be advanced out of the order determined by the queued read requests. The page may be read either by the requestor or by reordering the requests to the read threads. In a further alternative, information indicating the relative likelihood that particular page will be required before other pages may be maintained, for example in the PDs. This relative weight indicating hot pages may be used to order the read requests in the queue. For block read requests, an average or other block-wide rating may be computed from the ratings for individual pages. The restart subsystem could then queue up the pre-fetch read requests in a more intelligent fashion thereby predicting which pages are likely to be accessed first by clients.

The warm shutdown and restore of the buffer pool in accordance with the present invention serves to reduce shutdown and restart durations. I/O efficiency is optimized when saving and restoring the buffer pool's contents including pages and control information associated with the pages. The restart of a pre-populated buffer pool may enhance query processing upon restart.

The embodiment(s) of the invention described above is(are) intended to be exemplary only. The scope of the invention is therefore intended to be limited solely by the scope of the appended claims.

We claim:

1. A computer-implemented method for warm starting a buffer pool, wherein the buffer pool includes memory pages and control structures for the memory pages, the computer-implemented method comprising:
   receiving a restart signal to warm start a buffer pool;
   in response to receiving the restart signal, reading, from a file on a persistent memory, control structure information for memory pages in the buffer pool;
   writing the control structure information to a system memory in a computer;
   utilizing the control structure information to subsequently restore blocks of memory from the buffer pool to the system memory; and
   priority restoring a page of data, from the buffer pool, that has a higher likelihood of being required before other pages of data in the buffer pool, wherein information indicating said higher likelihood is maintained in a page descriptor.

2. The computer-implemented method of claim 1, wherein each particular block of memory is restored by a different reader thread from multiple reader threads.

3. The computer-implementable method of claim 1, wherein the persistent memory is a memory storage disk, and wherein the file is a sequential disk file.

4. The computer-implemented method of claim 1, wherein the control structure information includes a page latch construct that prevents read access to a buffer page of memory in the buffer pool until the step of subsequently restoring blocks of memory from the buffer pool is performed.

5. The computer-implemented method of claim 1, further comprising:
   prior to warm starting the buffer pool, performing a warm shutdown of the buffer pool by performing the step of, in response to a receipt of a warm shutdown request, saving the control structure information and the memory pages from the buffer pool to the persistent memory.

6. The computer-implemented method of claim 5, further comprising:
   storing, during the warm shutdown and in the control structures, likelihood information that indicates a relative likelihood that a particular page of memory will be required before other pages of memory after the warm restart.

7. The computer-implemented method of claim 5, wherein the warm shutdown request is received from a Database Management System (DBMS) that is adapted to save both clean and dirty pages of memory during the warm shutdown, wherein clean memory pages have not been modified to memory after having been read from disk, and wherein dirty memory pages include data that has been modified but not written to the persistent memory.

8. The computer-implemented method of claim 7, further comprising:
prior to warm starting the buffer pool to system memory, restarting the DBMS.

9. The computer-implementable method of claim 1, wherein multiple pages from the buffer pool are simultaneously saved to the persistent memory through a use of a different writer thread for each block of buffer pool memory.

10. A system for warm starting a buffer pool, wherein the buffer pool includes memory pages and control structures for the memory pages, the system comprising:
means for receiving a restart signal to warm start a buffer pool;
means for, in response to receiving the restart signal, reading, from a file on a persistent memory, control structure information for memory pages in the buffer pool;
means for writing the control structure information to a system memory in a computer;
means for utilizing the control structure information to subsequently restore blocks of memory from the buffer pool to the system memory; and
means for priority restoring a page of data, from the buffer pool, that has a higher likelihood of being required before other pages of data in the buffer pool, wherein information indicating said higher likelihood is maintained in a page descriptor.

11. The system of claim 10, further comprising:
means for prior to warm starting the buffer pool, performing a warm shutdown of the buffer pool by performing the step of, in response to a receipt of a warm shutdown request, saving the control structure information and the memory pages from the buffer pool to the persistent memory.

12. The system of claim 11, further comprising:
means for storing, during the warm shutdown and in the control structures, likelihood information that indicates a relative likelihood that a particular page of memory will be required before other pages of memory after the warm restart.

13. The system of claim 10, wherein multiple pages from the buffer pool are simultaneously saved to the persistent memory through a use of a different writer thread for each block of buffer pool memory.

14. A nontransitory computer-readable medium encoded with a computer program for warm starting a buffer pool, wherein the buffer pool includes memory pages and control structures for the memory pages, and wherein the computer program, when executed, performs the steps of:
receiving a restart signal to warm start a buffer pool;
in response to receiving the restart signal, reading, from a file on a persistent memory, control structure information for memory pages in the buffer pool;
writing the control structure information to a system memory in a computer;
utilizing the control structure information to subsequently restore blocks of memory from the buffer pool to the system memory; and
priority restoring a page of data, from the buffer pool, that has a higher likelihood of being required before other pages of data in the buffer pool, wherein information indicating said higher likelihood is maintained in a page descriptor.

15. The non-transitory computer-readable medium of claim 14, wherein the computer program further performs the step of:
prior to warm starting the buffer pool, performing a warm shutdown of the buffer pool by performing the step of, in response to a receipt of a warm shutdown request, saving the control structure information and the memory pages from the buffer pool to the persistent memory.

16. The non-transitory computer-readable medium of claim 15, wherein the computer program further performs the step of:
means for storing, during the warm shutdown and in the control structures, likelihood information that indicates a relative likelihood that a particular page of memory will be required before other pages of memory after the warm restart.

17. The non-transitory computer-readable medium of claim 14, wherein multiple pages from the buffer pool are simultaneously saved to the persistent memory through a use of a different writer thread for each block of buffer pool memory.

* * * * *